United States Patent
Kubo et al.

(10) Patent No.: US 10,150,846 B2
(45) Date of Patent: Dec. 11, 2018

(54) COLORED METALLIC PIGMENT AND COLORED ARTICLE

(71) Applicant: TOYO ALUMINIUM KABUSHIKI KAISHA, Osaka-shi, Osaka (JP)

(72) Inventors: Katsunobu Kubo, Osaka (JP); Satosi Kobayashi, Osaka (JP); Takefumi Aoki, Osaka (JP)

(73) Assignee: TOYO ALUMINIUM KABUSHIKI KAISHA, Osaka-Shi, Osaka (JP)

( * ) Notice: Subject to any disclaimer, the term of this patent is extended or adjusted under 35 U.S.C. 154(b) by 0 days.

(21) Appl. No.: 15/908,398

(22) Filed: Feb. 28, 2018

(65) Prior Publication Data

US 2018/0186945 A1 Jul. 5, 2018

Related U.S. Application Data

(62) Division of application No. 14/431,673, filed as application No. PCT/JP2013/075917 on Sep. 25, 2013, now abandoned.

(30) Foreign Application Priority Data

Sep. 27, 2012 (JP) .................................. 2012-214582

(51) Int. Cl.
| | | |
|---|---|---|
| *C09C 1/62* | (2006.01) | |
| *C09C 3/00* | (2006.01) | |
| *C08J 5/00* | (2006.01) | |
| *C09C 3/08* | (2006.01) | |
| *C08K 3/08* | (2006.01) | |
| *C09C 1/64* | (2006.01) | |

(52) U.S. Cl.
CPC .................. *C08J 5/00* (2013.01); *C08K 3/08* (2013.01); *C09C 1/62* (2013.01); *C09C 1/644* (2013.01); *C09C 3/08* (2013.01); *C01P 2006/65* (2013.01); *C08J 2335/02* (2013.01); *C08K 2003/0812* (2013.01)

(58) Field of Classification Search
CPC .................................. C09C 1/62; C09C 3/006
See application file for complete search history.

(56) References Cited

U.S. PATENT DOCUMENTS

| | | |
|---|---|---|
| 5,037,475 A | 8/1991 | Chida et al. |
| 5,912,283 A | 6/1999 | Hashizume et al. |
| 5,944,886 A | 8/1999 | Hashizume |
| 2007/0044682 A1 | 3/2007 | Nick et al. |
| 2010/0160536 A1 | 6/2010 | Lee et al. |
| 2012/0022198 A1 | 1/2012 | Xu et al. |
| 2013/0035400 A1 | 2/2013 | Nguyen et al. |
| 2016/0053128 A1 | 2/2016 | Kubo |

FOREIGN PATENT DOCUMENTS

| | | |
|---|---|---|
| CN | 101291996 A | 10/2008 |
| CN | 102325845 A | 1/2012 |
| CN | 102337059 A | 2/2012 |
| EP | 0 755 986 A2 | 1/1997 |
| EP | 2 410 022 A1 | 1/2012 |
| EP | 2 980 173 A1 | 2/2016 |
| JP | 63-027419 A | 2/1988 |
| JP | 01-315470 A | 12/1989 |
| JP | 05-156182 A | 6/1993 |
| JP | 6-327419 A | 11/1994 |
| JP | 09-071734 A | 3/1997 |
| JP | 09-124973 A | 5/1997 |
| JP | 09-316357 A | 12/1997 |
| JP | 10-168339 A | 6/1998 |
| JP | 2000-273349 A | 10/2000 |
| JP | 3481360 B2 | 12/2003 |
| JP | 2008-88317 A | 4/2008 |
| JP | 2012-031408 A | 2/2012 |
| WO | WO 2011/095341 A1 | 8/2011 |

*Primary Examiner* — Vickey Nerangis
(74) *Attorney, Agent, or Firm* — Birch, Stewart, Kolasch & Birch, LLP

(57) ABSTRACT

A colored metallic pigment of the present invention contains a metallic pigment, a coloring pigment, a first compound and a second compound. The coloring pigment adheres to the surface of the metallic pigment in the coexistence of the first compound and the second compound, the first compound is a compound having two or more carboxyl groups, and the second compound is a compound having one or more amino groups.

4 Claims, No Drawings

COLORED METALLIC PIGMENT AND COLORED ARTICLE

CROSS-REFERENCE TO RELATED APPLICATIONS

This application is a Divisional of copending application Ser. No. 14/431,673 filed on Mar. 26, 2015, which is the National Phase under 35 U.S.C. § 371 of International Application No. PCT/JP2013/075917, filed on Sep. 25, 2013, which claims the benefit under 35 U.S.C. § 119(a) to Patent Application No. 2012-214582, filed in Japan on Sep. 27, 2012, all of which are hereby expressly incorporated by reference into the present application.

TECHNICAL FIELD

The present invention relates to a colored metallic pigment and a colored article.

BACKGROUND ART

In order to attain a decorative effect with metallic feeling, metallic pigments such as aluminum fine powders are widely used. Further, in recent years, colored metallic pigments having various color tones are developed.

As such colored metallic pigments, a colored metallic pigment obtained by forming, on the surface of a metallic pigment, a resin film containing a coloring pigment is generally known. For example, a colored metallic pigment is known which is prepared by adding a monomer, a metallic pigment and a coloring pigment to an organic solvent in which a monomer having a double bond is soluble but a polymer (resin) obtained by polymerizing the monomer is insoluble, and then adding a polymerization initiator to the resulting mixture to polymerize the monomer, so that a resin layer containing a coloring pigment is formed on the surface of the metallic pigment. However, the colored metallic pigment obtained by this method does not attain a good gloss level and a high color saturation level.

Accordingly, as a technique for solving the problem, for example, Japanese Patent Laying-Open No. 01-315470 (PTD 1) discloses a colored metallic pigment prepared by chemisorbing a coloring pigment onto the surface of a metallic pigment through a carboxylic acid which has at least one double bond and at least two carboxyl groups and is prepared by thermally polymerizing at least one carboxylic acid having double bonds.

Further, Japanese Patent Laying-Open No. 09-124973 (PTD 2) discloses a colored metallic pigment formed by allowing a coloring pigment, which is surface-treated with an amino compound having two amino groups but no carboxyl group in each molecule, to adhere to base material particles such as aluminum flake.

CITATION LIST

Patent Document

PTD 1: Japanese Patent Laying-Open No. 01-315470
PTD 2: Japanese Patent Laying-Open No. 09-124973

SUMMARY OF INVENTION

Technical Problem

The approach of PTD 1 is to previously treat the surface of the metallic pigment, and the approach of PTD 2 is to previously treat the surface of the coloring pigment, and therefore, both the patent documents employ completely different approaches. However, both the techniques are common in point of allowing the coloring pigment to adhere to the metallic pigment in a state where another compound is previously adhered to the surface of the metallic pigment or the coloring pigment.

However, as to these techniques of allowing the coloring pigment to adhere to the metallic pigment in a state where another compound is previously adhered to the metallic pigment or the coloring pigment, it has been thought that there is a limit on an adhering force between the metallic pigment and the coloring pigment, and a stronger adhering force is required. The reason for this is that the strong adhering force between the metallic pigment and the coloring pigment enables good gloss or high color saturation of the colored metallic pigment.

As the compound previously adhered to the surface in both the techniques, a carboxylic acid is used in PTD 1, and an amine is used in PTD 2. When both the techniques are used in combination, agglomeration due to salt formation between acid and base occurs. Therefore, it has been thought that the combined use of both the techniques is impossible.

Thus, the present invention employs an approach completely different from those of both the techniques, and an object of the invention is to provide a colored metallic pigment having good gloss or high color saturation by strong adhesion of a coloring pigment to the surface of a metallic pigment.

Solution to Problem

In order to solve the above-mentioned problems, the present inventors have made earnest investigations, and consequently found that direct adhesion of a coloring pigment to the surface of a metallic pigment in the coexistence of another compound can achieve a stronger adhesion state as distinct from the case where a coloring pigment is allowed to adhere to the surface of a metallic pigment in a state where another compound is previously adhered to the surface of the metallic pigment or the coloring pigment as in PTD 1 or PTD 2. Further investigations based on this finding have led to completion of the present invention.

That is, a colored metallic pigment of the present invention contains a metallic pigment, a coloring pigment, a first compound, and a second compound. The coloring pigment adheres to the surface of the metallic pigment in the coexistence of the first compound and the second compound, the first compound is a compound having two or more carboxyl groups, and the second compound is a compound having one or more amino groups.

Herein, the first compound is preferably a polymer of an unsaturated carboxylic acid or a dibasic acid, and more preferably a polymer of an unsaturated carboxylic acid. Further, the second compound is preferably an amine having one or more amino groups. Moreover, the first compound is preferably a polymerized carboxylic acid obtained by polymerizing linseed oil fatty acid or soybean oil fatty acid, or a polymerized carboxylic acid obtained by polymerizing linseed oil fatty acid or soybean oil fatty acid with acrylic acid, and the second compound is preferably at least one amine selected from the group consisting of ethylenediamine, phenylenediamine, tetramethylenediamine, pentamethylenediamine, hexamethylenediamine, 1,12-dodecanediamine, alicyclic diamine, alicyclic triamine, alicyclic tetraamine, and alicyclic polyamine.

Further, in the colored metallic pigment of the present invention, a protective layer is preferably formed on the surface of the colored metallic pigment.

Further, the present invention also relates to a colored article containing the colored metallic pigment.

Advantageous Effects of Invention

In the colored metallic pigment of the present invention, the coloring pigment strongly adheres to the metallic pigment, and accordingly, the invention has an excellent effect such as good gloss or high color saturation.

DESCRIPTION OF EMBODIMENTS

Hereinafter, the present invention will be described in more detail.

<Colored Metallic Pigment>

A colored metallic pigment of the present invention contains a metallic pigment, a coloring pigment, a first compound, and a second compound. The coloring pigment adheres to the surface of the metallic pigment in the coexistence of the first compound and the second compound, the first compound is a compound having two or more carboxyl groups, and the second compound is a compound having one or more amino groups.

As described above, the colored metallic pigment of the present invention employs an approach that is completely different from those of conventional techniques, that is, an approach of allowing the coloring pigment to adhere to the surface of the metallic pigment in a state where another compound is previously adhered to the surface of the metallic pigment or the coloring pigment. That is, the coloring pigment used in the present invention is not used in a state where another compound is previously adhered to its surface, but the coloring pigment adheres directly to the surface of the metallic pigment in a state where substantially no other compound is adhered to its surface. Further, in this case, substantially no other compound is adhered to the surface of the metallic pigment in advance. However, when the coloring pigment adheres to the metallic pigment, a first compound and a second compound described later coexist.

The first compound is a compound having two or more carboxyl groups, and is substantially an acid. On the other hand, the second compound is a compound having one or more amino groups, and is substantially a base. Accordingly, when the first compound and the second compound are mixed in a state of previously adhered to the surfaces of the metallic pigment and the coloring pigment, respectively, agglomeration due to salt formation between acid and base occurs rapidly, and therefore it becomes impossible to allow the coloring pigment to selectively adhere to the surface of the metallic pigment.

In contrast, it is found that when the coloring pigment is allowed to adhere to the surface of the metallic pigment in the coexistence of the first compound and the second compound, surprisingly, such agglomeration does not occur at all and the coloring pigment strongly adheres to the surface of the metallic pigment. The details of this mechanism are unclear; however, it is presumed that agglomeration of the first compound and the second compound occurs in a micro state, the agglomerate is deposited on each metallic pigment particle surface before it gets into a macro state, this deposition proceeds while taking the coloring pigment in, and consequently the coloring pigment strongly adheres to the surface of the metallic pigment by the action of the first compound and the second compound.

Accordingly, in the present invention, the case where the coloring pigment adheres to the surface of the metallic pigment does not necessarily mean a case where the coloring pigment and the metallic pigment are in direct contact with each other, but may also mean a state where the coloring pigment adheres to the metallic pigment with the first compound and/or the second compound interposed therebetween. Therefore, the expression that the coloring pigment "adheres to the surface of the metallic pigment in the coexistence of the first compound and the second compound" encompasses both the following physical states: a state in which the coloring pigment is in direct contact with and adheres to the metallic pigment, and a state in which the coloring pigment adheres to the metallic pigment with the first compound and/or the second compound interposed therebetween. In the present invention, it is thought that the metallic pigment usually has a state in which a plurality of coloring pigment particles adhere to the surface of one metallic pigment particle, and the first compound and the second compound exist on the metallic pigment with or without the coloring pigment interposed therebetween.

As described above, in the colored metallic pigment of the present invention, the coloring pigment strongly adheres to the metallic pigment, and therefore, the colored metallic pigment exhibits good gloss or high color saturation.

Herein, the average particle size of the colored metallic pigment of the present invention is not particularly limited; however, it is preferably 1 to 300 µm, and more preferably 5 to 50 µm. When the average particle size is less than 1 µm, metallic feeling may be weakened, and when the average particle size is more than 300 µm, smoothness of the surface of a coating film may be impaired. In the present invention, the average particle size refers to the volume average particle size which is determined by calculating the volume average of the colored metallic pigment based on the particle size distribution measured by a publicly known particle size distribution measurement method such as laser diffractometry.

<Metallic Pigment>

The metallic pigment constituting the colored metallic pigment of the present invention can be any conventionally known metallic pigment as long as it exhibits metallic feeling, and is not particularly limited.

Examples of the metallic pigment may include metallic pigments composed of metals such as aluminum, zinc, copper, iron, bronze, nickel, titanium and stainless steel, and metallic pigments composed of alloys containing these metals. Among these metallic pigments, an aluminum pigment made of aluminum is high in light reflectance, excellent in metallic luster, low-priced and easy to handle due to its small specific gravity, and is particularly preferable.

It should be noted that the metallic pigments also include inorganic compound particles (such as glass, mica, or ceramic particles like alumina or titania), and particles which are prepared by forming a metal film through plating or the like on the surface of inorganic compound particles and which have metallic feeling.

Hereinafter, an aluminum pigment particularly suitable for the metallic pigment will be described. Herein, the aluminum pigment used in the present invention may be formed from aluminum only or from an aluminum-based alloy, and the purity of aluminum is not particularly limited. Further, a surface treatment for forming a metal oxide coat for improving corrosion resistance and design may be applied to the surface of the aluminum pigment.

Further, as the shape of the aluminum pigment used in the present invention, various shapes such as granular, platelike, aggregated and flaky (scaly) shapes can be employed; however, when the aluminum pigment is used as a paint, its shape is preferably a flaky shape in order to provide superior metallic feeling and excellent brightness to the coating film.

The average particle size of the aluminum pigment used in the present invention is not particularly limited; however, it is preferably 1 μm or more, and particularly preferably 5 μm or more. Further, the average particle size is preferably 100 μm or less, and more preferably 50 μm or less.

When the average particle size is 1 μm or more, handling in the production is easy, and the aluminum pigment tends not to agglomerate, and when the average particle size is 100 μm or less, the surface of the coating film when the aluminum pigment is used as a paint can be prevented from getting rough, thus realizing a preferred design.

Moreover, the average thickness of the aluminum pigment used in the present invention is not particularly limited; however, it is preferably 0.02 μm or more, and particularly preferably 0.1 μm or more. Further, the average thickness is preferably 5 μm or less, and more preferably 2 μm or less. When the average thickness is 0.02 μm or more, it is advantageous in terms of ease of handling in the production, and when the average thickness is 5 μm or less, it is advantageous in terms of the outer appearance of the paint composition such as a coating film.

Herein, the average particle size of the aluminum pigment used in the present invention is determined by calculating the volume average thereof based on the particle size distribution measured by a publicly known particle size distribution measurement method such as laser diffractometry. Further, the average thickness can be calculated based on the hiding power and density of the aluminum pigment.

The method for obtaining the aluminum pigment used in the present invention is not particularly limited, and may be a method in which an aluminum powder as a raw material is ground or milled using a grinding aid such as fatty acid in, for example, a ball mill or an attritor mill in the presence of grinding media, or a method in which aluminum vapor-deposited foil which is obtained by vapor-depositing aluminum on a film is crushed. A mineral oil with a high flashing point, such as mineral spirit or solvent naphtha, can be used as the grinding medium.

The foregoing description also applies to any metallic pigment other than the aluminum pigment.

<Coloring Pigment>

Conventionally known pigments can be used for the coloring pigment constituting the colored metallic pigment of the present invention without any particular limitation.

Since the metallic pigment in the present invention principally has an action of imparting metallic luster and its color is often achromatic, the coloring pigment principally has an action of imparting a chromatic color. However, a color to be imparted is not limited to a chromatic color, and the coloring pigment may have an action of imparting an achromatic color such as white or black.

Examples of the coloring pigment may include the following: organic pigments such as diketopyrrolopyrrole-based, quinacridone-based, dioxazine-based, isoindolinone-based, condensed azo-based, threne-based, perinone-based, perylene-based, quinophthalone-based, and phthalocyanine-based pigments; and inorganic pigments such as iron oxide and carbon black.

Specific examples thereof may include phthalocyanine, halogenated phthalocyanine, quinacridone, diketopyrrolopyrrole, isoindolinone, azomethine metal complex, indanthrone, perylene, perinone, anthraquinone, dioxazine, benzimidazolone, condensed azo, triphenylmethane, quinophthalone, anthrapyrimidine, iron oxide, ultramarine blue, iron blue, cobalt blue, chrome green, bismuth vanadate, fired composite oxide pigment, aniline black, carbon black, titanium black, titanium oxide, ultrafine particle titanium oxide and the like.

When the colored metallic pigment of the present invention is used in a cosmetic, coloring pigments can also be used which are generally used in cosmetics such as tar dyes for cosmetics and pharmaceuticals permitted in various countries and pigments meeting standards for cosmetic raw materials in consideration of safety to the skin.

Examples of the particularly preferred pigment in terms of adhesive property to the metallic pigment, weather resistance and coloring power may include phthalocyanine blue, phthalocyanine green, quinacridone red, quinacridone magenta, quinacridone gold, anthraquinone, indanthrene blue, diketopyrrolopyrrole, isoindolinone yellow, isoindolinone orange, anthrapyrimidine yellow, dioxazine violet, perylene maroon, azomethine copper complex, benzimidazolone-based monoazo pigment, transparent iron oxide, carbon black, ultrafine particle titanium oxide and the like.

The primary particle size of the coloring pigment is not particularly limited, and a coloring pigment having a primary particle size in the range of 0.01 to 1 μm is preferred, and a coloring pigment having a primary particle size in the range of 0.02 to 0.2 μm is more preferred. When the primary particle size is 0.01 μm or more, it is easy to disperse the coloring pigment, and when the primary particle size is 1.0 μm or less, it is easy to uniformly adhere the coloring pigment to the surface of the metallic pigment.

The adhering amount of the coloring pigment is 1 part by mass or more and 200 parts by mass or less, and more preferably 5 parts by mass or more and 100 parts by mass or less with respect to 100 parts by mass of the metallic pigment. The adhering amount is preferably adjusted appropriately in accordance with the specific surface area of the metallic pigment. When the adhering amount is less than 1 part by mass, the colored metallic pigment to be finally obtained cannot attain sufficient color saturation, and when the adhering amount is more than 200 parts by mass, the brightness of the colored metallic pigment to be finally obtained is lowered.

The coloring pigment of the present invention includes materials classified into a dye as long as the materials maintain a particle state under predetermined conditions.

<First Compound>

The first compound constituting the colored metallic pigment of the present invention is a compound having two or more carboxyl groups. The first compound has an action of allowing the coloring pigment to adhere to the surface of the metallic pigment by synergistic action with the second compound described later.

The compound used as the first compound is not particularly limited as long as it is a compound having two or more carboxyl groups, and the upper limit of the number of carboxyl groups in a molecule is not particularly limited.

As the first compound, a carboxylic acid having two or more carboxyl groups is preferred, and a carboxylic acid having at least one double bond and two or more carboxyl groups, or a polymer thereof, or a dibasic acid is more preferred. Further, as such a polymer, a polymer of an unsaturated carboxylic acid is preferred, and a thermally polymerized carboxylic acid is particularly preferred. The thermally polymerized carboxylic acid refers to a carboxylic acid having one or more double bonds and two or more carboxyl groups, which is obtained by thermally polymerizing one or more kinds of carboxylic acids having a double bond.

Examples of the starting material of the polymer of an unsaturated carboxylic acid may include 3-octenoic acid, 10-undecenoic acid, oleic acid, linoleic acid, elaidic acid, acrylic acid and linolenic acid which are respectively a compound having a double bond and a carboxyl group; and tall oil fatty acid, palm oil fatty acid, rice bran oil fatty acid, linseed oil fatty acid and soybean oil fatty acid which are respectively a fatty acid mixture industrially supplied, and these may be used singly, or may be used in combination of two or more thereof.

More preferable examples of the polymer of an unsaturated carboxylic acid may include a polymerized carboxylic acid obtained by polymerizing linseed oil fatty acid or soybean oil fatty acid, a polymerized carboxylic acid obtained by polymerizing linseed oil fatty acid or soybean oil fatty acid with acrylic acid, a polymerized carboxylic acid obtained by polymerizing tall oil fatty acid, and the like, and particularly may include a thermally polymerized carboxylic acid obtained by thermally polymerizing linseed oil fatty acid or soybean oil fatty acid, a thermally polymerized carboxylic acid obtained by thermally polymerizing linseed oil fatty acid or soybean oil fatty acid with acrylic acid, and the like.

Examples of a commercially available product of the polymerized carboxylic acid may include HARIDIMER 200, HARIDIMER 300, DIACID 1550 (trademarks, produced by Harima Chemicals Group, Inc.), Pripol 1017 (trademark, produced by Uniqema B.V.), Empol 1008 (trademark, produced by Cognis Corporation), Unidyme 27 (trademark, produced by Arizona Chemical Company, LLC.), Bersadime 216 (trademark, produced by Henkel Japan Ltd.) and the like.

The dibasic acid is preferably at least one dibasic acid selected from the group consisting of hexanedioic acid, heptanedioic acid, octanedioic acid, nonanedioic acid, decanedioic acid, phthalic acid, isophthalic acid, terephthalic acid, acetone dicarboxylic acid, dodecanedioic acid, eicosanoic diacid, eicosadienoic diacid, ethyloctadecanedioic acid, dimethyleicosanoic diacid, octadecanedienedioic acid, isodocosadienoic diacid, isodocosanoic diacid, isoeicosadienoic diacid, butyloctanedioic acid, and dialkoxycarbonylisodocosadienoic diacid.

Here, the amount of the first compound contained in the colored metallic pigment varies depending on the surface area of the metallic pigment to be used and the amount of the coloring pigment to be used, but the amount is preferably 0.1 parts by mass or more and 30 parts by mass or less, and in particular, more preferably 0.5 parts by mass or more and 20 parts by mass or less with respect to 100 parts by mass of the metallic pigment. When the amount is less than 0.1 parts by mass, it is not possible to allow the coloring pigment to adequately adhere to the surface of the metallic pigment, and even when the amount is more than 30 parts by mass, the effect of allowing the coloring pigment to adhere to the metallic pigment is not improved, and therefore, it is economically disadvantageous.

<Second Compound>

The second compound constituting the colored metallic pigment of the present invention is a compound having one or more amino groups. The second compound has an action of allowing the coloring pigment to adhere to the surface of the metallic pigment by synergistic action with the above-mentioned first compound.

The compound used as the second compound is not particularly limited as long as it is a compound having one or more amino groups, and the upper limit of the number of amino groups in a molecule is not particularly limited. As the second compound, an amine having one or more amino groups is particularly preferred. The reason for this is because the amine has an action of allowing the coloring pigment to particularly strongly adhere to the surface of the metallic pigment. The amino group referred to in the present invention refers to a monovalent functional group obtained by removing hydrogen from ammonia, a primary amine or a secondary amine.

The amine having one or more amino groups as described above is preferably an amine having two or more amino groups. More specifically, examples thereof may include at least one amine selected from the group consisting of ethylenediamine, phenylenediamine, tetramethylenediamine, pentamethylenediamine, hexamethylenediamine, 1,12-dodecanediamine, alicyclic diamine, alicyclic triamine, alicyclic tetraamine, and alicyclic polyamine (the number of amino groups is five or more).

Here, the amount of the second compound contained in the colored metallic pigment varies depending on the surface area of the metallic pigment to be used and the amount of the coloring pigment to be used, but the amount is preferably 0.1 parts by mass or more and 30 parts by mass or less, and in particular, more preferably 0.5 parts by mass or more and 20 parts by mass or less with respect to 100 parts by mass of the metallic pigment. When the amount is less than 0.1 parts by mass, it is not possible to allow the coloring pigment to adequately adhere to the surface of the metallic pigment, and when the amount is more than 30 parts by mass, agglomeration occurs and it is not possible to allow the coloring pigment to adequately adhere to the surface of the metallic pigment.

<Protective Layer>

The colored metallic pigment of the present invention preferably has a protective layer formed on the surface thereof. The protective layer further improves the adhesive property of the coloring pigment and has an action of imparting water resistance by covering densely the colored metallic pigment. The water resistance referred to herein refers to the action of suppressing gas generation when the colored metallic pigment is blended with a water-based paint or water-based ink or the like, to be brought into contact with moisture. Further, while the protective layer preferably covers the entire surface of the colored metallic pigment, the protective layer does not have to cover part of the surface of the colored metallic pigment depending on the production conditions and the like.

The protective layer is preferably composed of a resin obtained by subjecting a monomer and/or an oligomer having at least one polymerizable double bond to radical polymerization, or an oxide or a hydroxide of at least one element selected from the group consisting of Al, Si, Ti, Cr, Zr, Mo, and Ce. Further, the protective layer may be composed of both the resin and the oxide or the hydroxide, and in this case, the order of forming layers of the resin and the oxide or the hydroxide is not particularly limited.

The resin constituting the protective layer can strongly fix the coloring pigment allowed to adhere to the surface of the metallic pigment, and it becomes possible to prevent exfoliation of the coloring pigment. Here, the resin constituting the protective layer refers to a high-molecule resin-like compound obtained by subjecting a monomer and/or an oligomer having at least one polymerizable double bond to radical polymerization. Accordingly, since the resin is obtained by subjecting a monomer and/or an oligomer having at least one polymerizable double bond to radical polymerization, by conducting the radical polymerization on the colored metallic pigment or in the vicinity thereof, a protective layer composed of the radical-polymerizable resin can be formed on the surface of the colored metallic pigment. Owing to the stable and dense coating layer formed on the surface of the colored metallic pigment from the radical-polymerizable resin, peeling of the coloring pigment from the colored metallic pigment to be finally obtained can be remarkably reduced.

When such a resin coating layer is formed, the amount of the radical-polymerizable resin is 0.5 to 100 parts by mass, and more preferably 5 to 50 parts by mass with respect to 100 parts by mass of the metallic pigment. The amount of the radical-polymerizable resin can be appropriately determined in consideration of the specific surface area of the metallic pigment, the density of the radical-polymerizable resin for covering, and the like.

The thickness of the resin coating layer formed from the radical-polymerizable resin is not particularly limited; however, when the thickness is 5 nm or more and 200 nm or less, it is advantageous in terms of the water resistance (which will be insufficient if the thickness is less than 5 nm) and the colored metallic pigment and the outer appearance (which will be deteriorated if the thickness is more than 200 nm) of the paint composition such as the coating film. The thickness may be measured through observing sections of the colored metallic pigment by using a scanning electron microscope or the like.

As a specific method of covering the colored metallic pigment with the resin, a method is preferable in which a monomer and/or an oligomer, and a polymerization initiator such as benzoyl peroxide, isobutyl peroxide or azobis isobutyronitrile are added to a dispersion prepared by dispersing the colored metallic pigment in a hydrocarbon-based or alcoholic solvent (preferably in a hydrocarbon-based solvent), and the resulting mixture is heated under stirring to allow the monomer and/or the oligomer to undergo the radical polymerization, thereby precipitating the radical-polymerizable resin on the surface of the colored metallic pigment.

In this case, the addition amount of the polymerization initiator is preferably 1 part by mass or more and 30 parts by mass or less with respect to 100 parts by mass of the monomer and/or the oligomer. The polymerization reaction is preferably conducted under oxygen-free atmosphere, for example in an inert gas such as nitrogen or argon. The reaction temperature is 50 to 150° C., and more preferably 70 to 110° C. The reaction time is preferably 30 minutes or more and 30 hours or less.

Examples of the above-mentioned monomer and/or oligomer include, but are not limited to, the following: acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentylglycol diacrylate, tripropyleneglycol diacrylate, tetraethyleneglycol diacrylate, trimethylolpropane triacrylate, trimethylolpropane trimethacrylate, tetramethylolmethane tetraacrylate, pentaerythritol triacrylate, trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidized soybean oil, epoxidized polybutadiene, cyclohexenevinyl monoxide, divinylbenzene monoxide, mono(2-acryloyloxyethyl)acid phosphate, mono(2-methacryloyloxyethyl)acid phosphate, 2-acryloyloxyethyl acid phosphate, 2-methacryloyloxyethyl acid phosphate, (2-hydroxyethyl)methacrylate acid phosphate, 2-methacryloyloxyethyl acid phosphate, 2-acryloyloxyethyl acid phosphate, diphenyl-2-methacryloyloxyethyl acid phosphate, diphenyl-2-acryloyloxyethyl acid phosphate, dibutyl-2-methacryloyloxyethyl acid phosphate, dibutyl-2-acryloyloxyethyl acid phosphate, dioctyl-2-methacryloyloxyethyl acid phosphate, dioctyl-2-acryloyloxyethyl acid phosphate, 2-methacryloyloxy propyl acid phosphate, bis(2-chloroethyl)vinyl phosphonate, di-2-methacryloyloxyethyl acid phosphate, tri-2-methacryloyloxyethyl acid phosphate, di-2-acryloyloxyethyl acid phosphate, tri-2-acryloyloxyethyl acid phosphate, diallyl dibutyl phosphono succinate, acrylic modified polyester (polymerization degree of about 2 to 20), acrylic modified polyether (polymerization degree of about 2 to 20), acrylic modified urethane (polymerization degree of about 2 to 20), acrylic modified epoxy (polymerization degree of about 2 to 20), acrylic modified spirane (polymerization degree of about 2 to 20) and the like.

Particularly, in the case where a monomer and/or an oligomer having two or more polymerizable double bonds is used as the monomer and/or the oligomer, a resin coating layer formed from a radical-polymerizable resin crosslinked in three dimensions is formed, which is advantageous in terms of further improving the water resistance.

In the colored metallic pigment, the identification that whether or not the protective layer is formed from the resin can be determined according to the remaining group analysis on the polymerization initiator by mass spectrometry, NMR or the like, and more simply according to the molecular weight, the molecular weight distribution, the glass-transition temperature, the solubility in organic solvent and the like.

Further, the oxide or the hydroxide constituting the protective layer is an oxide or a hydroxide of at least one element selected from the group consisting of Al, Si, Ti, Cr, Zr, Mo, and Ce. The use of the oxide or the hydroxide allows a dense coating film, which is stable against water, to be formed on the surface of the colored metallic pigment, so that it dramatically improves the water resistance of the colored metallic pigment to be finally obtained. The oxide or the hydroxide is preferably colorless for the purpose of not interfering with the color development of the coloring pigment previously adhered to the metallic pigment.

Specific examples of the oxide or the hydroxide may include silicon oxide, polysiloxane condensate, aluminum oxide, titanium oxide, aluminum hydroxide, molybdenum oxide, chromium oxide, zirconium oxide, zirconium hydroxide, cerium oxide, cerium hydroxide and the like. Among these, silicon oxide and/or polysiloxane condensate (i.e., silicon oxide alone, polysiloxane condensate alone, and a mixture of both) is preferable in terms of transparency, safety and production cost.

The oxide or the hydroxide may constitute the protective layer singly or as a mixture of two or more thereof. It should be noted that silicon oxide and polysiloxane condensate are both oxides of Si, and polysiloxane condensate is a compound obtained through condensation of organic silicon compounds by siloxane bond.

The use amount of the oxide or the hydroxide is preferably 0.5 parts by mass or more and 100 parts by mass or less, and more preferably 5 parts by mass or more and 30 parts by mass or less with respect to 100 parts by mass of the metallic pigment. The use amount of the oxide or the hydroxide can be determined in consideration of the intended thickness of the protective layer, the specific surface area of the metallic pigment, the density of the oxide or the hydroxide for covering, and the like. The thickness of the protective layer composed of the oxide or the hydroxide is not particularly limited; however, it is preferably 5 nm or more and 200 nm or less, since this level of thickness is advantageous in terms of the water resistance (which will be insufficient if the thickness is less than 5 nm) of the colored metallic pigment and the outer appearance (which will be deteriorated if the thickness is more than 200 nm) of the paint composition such as the coating film. The thickness may be measured through observing sections of the colored metallic pigment by using a scanning electron microscope or the like.

The method of covering the colored metallic pigment with the oxide or the hydroxide is not particularly limited, and examples thereof may include a method in which a precursor compound, such as salt or alkoxide of any of Al, Si, Ti, Cr, Zr, Mo, and Ce, is added to a dispersion prepared by dispersing the colored metallic pigment in water and/or a hydrophilic solvent, and thereafter a neutralizing agent for neutralizing the precursor compound or a hydrolysis catalyst for hydrolyzing the precursor compound is added so as to precipitate the oxide or the hydroxide on the surface of the colored metallic pigment.

Examples of the above-mentioned hydrophilic solvent include the following: methyl alcohol, ethyl alcohol, isopropyl alcohol, n-propyl alcohol, t-butyl alcohol, n-butyl alcohol, isobutyl alcohol, ethyl cellosolve, butyl cellosolve, butyl carbitol, propylene glycol monobutyl ether, propylene glycol monomethyl ether, dipropylene glycol monomethyl ether, propylene glycol monopropyl ether, and acetone.

Examples of the above-mentioned precursor compound of the oxide or hydroxide include the following: salts such as aluminum nitrate, cerium nitrate, cerium acetate, titanyl sulfate and ammonium molybdate; methyltriethoxysilane, methyltrimethoxysilane, tetraethoxysilane, tetramethoxysilane, tetraisopropoxysilane, tetraisopropoxy titanium, tetrabuthoxy titanium, tetrabuthoxy zirconium, triisopropoxy aluminum and the like; and condensates thereof.

Examples of the above-mentioned neutralizing agent and hydrolysis catalyst include the following:
the neutralizing agent: ammonia, sodium hydroxide, potassium hydroxide and the like; basic hydrolysis catalysts: monoethanolamine, diethanolamine, triethanolamine, ammonia, ethylenediamine, t-butylamine, γ-aminopropyltriethoxysilane, N-2-aminoethyl-3-aminopropyltriethoxysilane, N-2-aminoethyl-3-aminopropyl methyl dimethoxy silane, urea, sodium silicate, sodium hydroxide and the like; and acidic hydrolysis catalysts: oxalic acid, acetic acid, nitric acid, sulfuric acid, phosphoric acid, phosphonic acid and the like.

As the oxide or the hydroxide, particularly silicon oxide and/or polysiloxane condensate is preferred. As a method of forming the protective layer by using these materials, in the case of silicon oxide, for example, a method of stirring or kneading the colored metallic pigment and a solution containing a silicon compound in a slurry or paste state with the mixture being kept at basic or acidic condition may be adopted, and thereby the protective layer composed of silicon oxide can be formed on the surface of the colored metallic pigment. Further, in the case of polysiloxane condensate, for example, in the coexistence of the colored metallic pigment and alkoxysilane, alkoxysilane is hydrolyzed and condensed to form the protective layer composed of polysiloxane condensate on the surface of the colored metallic pigment. However, the method of forming the protective layer is not limited to these methods.

<Production Method>

The colored metallic pigment of the present invention is characterized by the above-mentioned constitution, particularly in that the coloring pigment adheres to the surface of the metallic pigment in the coexistence of the first compound and the second compound. A method of allowing the coloring pigment to adhere to the surface of the metallic pigment in the coexistence of the first compound and the second compound, that is, a method for producing a colored metallic pigment of the present invention is not particularly limited.

For example, by mixing the metallic pigment, the first compound, the second compound, and the coloring pigment, it is possible to produce the colored metallic pigment of the present invention having the constitution as described above. As described above, it is a characteristic of the present invention to be capable of producing the colored metallic pigment by a simple method.

It should be noted that the metallic pigment, the first compound, the second compound, and the coloring pigment may be mixed in any order, and the order of mixing these components is not particularly limited. For example, all the components may be added at once and mixed, or the respective components may be added one-by-one with mixing. Further, the coloring pigment may be added as it is, or may be dispersed by a dispersing machine before addition.

In the mixing, it is preferred to use a solvent in order to disperse or dissolve the respective components. The mixing may be conducted in a slurry state by use of a stirrer or the like, or may be conducted in a paste state by use of a kneading machine such as a kneader mixer.

Further, in this mixing, with respect to the mixing ratio between the metallic pigment and the first compound, the amount of the first compound is preferably 0.01 to 0.3 parts by mass, and more preferably 0.05 to 0.2 parts by mass with respect to 1 part by mass of the metallic pigment. Similarly, with respect to the mixing ratio between the metallic pigment and the second compound, the amount of the second compound is preferably 0.01 to 0.3 parts by mass, and more preferably 0.05 to 0.2 parts by mass with respect to 1 part by mass of the metallic pigment. When the amounts of the first compound and the second compound are respectively less than 0.01 parts by mass, there may be a case where the coloring pigment is not adequately adhered, whereas when the amounts are more than 0.3 parts by mass, the adhesive property of the coloring pigment is not improved. However, the amounts of the first compound and the second compound are not intended to be limited to these ranges.

Meanwhile, with respect to the mixing ratio between the metallic pigment and the coloring pigment, the amount of the coloring pigment is preferably 0.01 to 3 parts by mass, and more preferably 0.1 to 1 part by mass with respect to 1 part by mass of the metallic pigment.

On the other hand, the solvent to be formed into a slurry state or a paste state is not particularly limited. A polar solvent such as water, alcohol or ether can be used, or a non-polar solvent such as an aromatic hydrocarbon or an aliphatic hydrocarbon can also be used. However, a non-polar solvent is preferably used in order to avoid the influence of corrosion due to the solvent on the metallic pigment.

As the non-polar solvent, an aliphatic hydrocarbon, an aromatic hydrocarbon, a mixture thereof and the like, which have a boiling point falling within the range of about 100°

C. to 250° C., are suitably used. Specific examples thereof may include, but are not limited to, normal paraffin, isoparaffin, toluene, xylene, solvent naphtha, kerosene, mineral spirits, petroleum benzine and the like.

The mixing ratio between the metallic pigment and the non-polar solvent is not particularly limited; however, the amount of the nonpolar solvent is preferably 0.1 to 5 parts by mass with respect to 1 part by mass of the metallic pigment. When the amount of the non-polar solvent is less than 0.1 parts by mass, there may be a case where dispersion or dissolution of the respective components is difficult, and when the amount is more than 5 parts by mass, there may be a case where a long time is required in a filtration step of separating the colored metallic pigment to be finally obtained from the solvent, resulting in reduction in productivity.

The mixing time is not particularly limited; however, it is preferably in the range of 1 minute to 2 hours, and more preferably 1 minute to within 1 hour. When the mixing time is less than 1 minute, there may be a case where adhesion of the coloring pigment is not adequate and the design of the resulting colored metallic pigment is deteriorated, and even when the mixing time is more than 2 hours, the adhesive property of the coloring pigment is not improved, and there may be a case where productivity is reduced. Further, an unnecessarily long mixing time may cause deformation of the metallic pigment itself.

The temperature at the time of mixing is not particularly limited; however, it is preferably in the range of 0° C. to 150° C. When the temperature is lower than 0° C., there may be a case where the coloring pigment does not adequately adhere to the metallic pigment, and even when it is higher than 150° C., the adhesive property of the coloring pigment is not improved, and there may be a case where energy loss occurs.

The metallic pigment preferably undergoes, prior to the above mixing, a degreasing step of removing fatty acid or the like adhered to the surface of the metallic pigment to be used. Particularly, in the case of the metallic pigment produced by using a grinding aid such as fatty acid as with the aluminum pigment, fatty acid or the like serving as a grinding aid adheres to the surface of the metallic pigment, and there is a possibility that the fatty acid interferes with the adhesion of the coloring pigment. Therefore, the metallic pigment preferably undergoes the degreasing step before mixing.

The method of the degreasing step is not particularly limited, and examples of the method may include a method of removing fatty acid or the like adhered to the surface by dispersing the metallic pigment in a large amount of solvent; and a method of removing fatty acid or the like by bringing the metallic pigment into contact with another compound or mixing the metallic pigment with another compound to treat the surface of the metallic pigment. When the latter method is used, the fatty acid or the like can be removed, for example, by treating the surface of the metallic pigment with a compound containing molybdenum, by treating the surface of the metallic pigment with the oxide or the hydroxide of at least one element selected from the group consisting of Al, Si, Ti, Cr, Zr, Mo, and Ce, the oxide or the hydroxide being an example of the above-mentioned protective layer, or by treating the surface of the metallic pigment with the first compound. In the degreasing step, the fatty acid or the like does not have to be removed completely, and the fatty acid or the like may adhere to the surface as long as the effect of the present invention is not impaired.

When the protective layer is formed on the surface of the colored metallic pigment of the present invention, the protective layer can be formed, for example, by the above-mentioned method on the surface of the colored metallic pigment obtained in the manner described above.

<Colored Article>

The present invention also relates to a colored article containing the colored metallic pigment. Examples of the colored article may include a paint composition, an ink composition, a resin molded article, a cosmetic and the like.

Herein, examples of the paint composition or the ink composition may generally include compositions containing a colored metallic pigment, a resin component and a solvent. Particularly, a water-based composition containing a hydrophilic solvent as a solvent is excellent in water resistance, stability, and color development.

The amount of the colored metallic pigment contained in the composition is preferably 0.1 parts by mass or more and 50 parts by mass or less, and more preferably 1 part by mass or more and 30 parts by mass or less with respect to 100 parts by mass of the resin component. When the amount of the colored metallic pigment is less than 0.1 parts by mass, the intended design is not achieved, and when the amount is more than 50 parts by mass, the image clarity of the coating film is degraded.

The amount of the solvent to be contained in the composition is preferably 1 part by mass or more and 100 parts by mass or less, and more preferably 5 parts by mass or more and 50 parts by mass or less with respect to 100 parts by mass of the resin component. When the amount of the solvent is less than 1 part by mass, the dispersibility of the colored metallic pigment in the composition is insufficient, and when the amount is more than 100 parts by mass, the solvent evaporated in drying and curing the composition will be an issue of environmental pollution.

The resin component to be blended in the composition is not particularly limited, and examples thereof may include thermosetting acrylic resin/melamine resin, thermosetting acrylic resin/CAB (cellulose acetate butyrate)/melamine resin, thermosetting polyester (alkyd) resin/melamine resin, thermosetting polyester (alkyd)/CAB/melamine resin, isocyanate-curable urethane resin/cold setting acrylic resin, water-dilutable acrylic emulsion/melamine resin and the like.

The solvent to be blended in the composition is not particularly limited, and water, an alcohol-based, glycol-based, ketone-based or ester-based hydrophilic solvent (e.g., methyl alcohol, ethyl alcohol, isopropyl alcohol, n-propyl alcohol, t-butyl alcohol, n-butyl alcohol, isobutyl alcohol, ethyl cellosolve, butyl cellosolve, butyl carbitol, propylene glycol monobutyl ether, propylene glycol monomethyl ether, dipropylene glycol monomethyl ether, propylene glycol monopropyl ether, acetone, ethyl acetate or propyl acetate), or an oil-based solvent such as an aromatic, alicyclic, or hydrocarbon-based solvent (e.g., benzene, toluene, xylene, hexane, heptane, cyclohexane, octane or mineral spirit) can be used.

Further, additives such as a pigment dispersant, an anti-foaming agent, an anti-settling agent, and a curing catalyst, or other coloring pigments can be blended in the composition, if necessary.

On the other hand, examples of the above-mentioned resin molded article may include resin molded articles kneaded with the colored metallic pigment. The resin molded article referred to herein includes not only a final molded article but also a work-in-process intermediate article such as a synthetic resin coloring master batch which contains the colored metallic pigment to be blended in matrix resin for the purpose of coloring or a colored pellet which is obtained by kneading the synthetic resin coloring master batch and the matrix resin for the purpose of coloring into pellet shape.

The resin constituting the resin molded article is not particularly limited, and examples thereof may include polyethylene, polypropylene, chlorinated polyethylene, ethylene-vinyl acetate copolymer, polyvinyl chloride, polystyrene, acrylic resin, polycarbonate, polyamide, polyimide, ABS resin, AS resin and the like, and these may be used singly or may be used in combination of two or more thereof.

The amount of the colored metallic pigment contained in the resin molded article may be generally about 0.005 to 80 parts by mass, and preferably about 10 to 80 parts by mass with respect to 100 parts by mass of the resin. However, there may be a case where the amount of the colored metallic pigment falls out of the above-mentioned range depending on the properties of the colored metallic pigment to be used, the kind of the resin, and the usage of the final product.

On the other hand, the cosmetic containing the colored metallic pigment has a hiding power superior to a cosmetic containing a pearl pigment, and can exert a bright hue even if the cosmetic contains water. The kind of the cosmetic is not particularly limited, and examples thereof may include makeup cosmetics such as lipstick, foundation, blusher, eye shadow, nail enamel and mascara, hair cosmetics such as hair gel, hair wax, hair treatment, shampoo and hair manicure, and basic cosmetics such as lotion, foundation cream and sun block.

In these cosmetics, examples of constituent components other than the colored metallic pigment may include oils and fats (olive oil, castor oil, etc.), waxes (beeswax, carnauba wax, lanolin, etc.), hydrocarbon oils (liquid paraffin, squalane, polybutene), fatty acid esters (isopropyl myristate, cetyl 2-ethylhexanate, diisopropyl adipate, glyceryl trimyristate, etc.), higher fatty acids (oleic acid, isostearic acid, etc.), higher alcohols (isostearyl alcohol, oleyl alcohol, etc.), silicone oils (dimethyl polysiloxane, methylphenyl polysiloxane, etc.), fluorine compounds (perfluoropolyether, etc.) and the like.

The cosmetic can contain, if necessary, surfactant, humectant, polyhydric alcohol, water-soluble polymer, film former, water-insoluble polymer, polymer emulsion, powder, pigment, dye, lake, lower alcohol, ultraviolet absorber, vitamins, antioxidant, antibacterial agent, perfume and the like.

The amount of the colored metallic pigment contained in the cosmetic can be in the range of 0.1 to 99% by mass, and more preferably 1 to 80% by mass. A method of formulating the colored metallic pigment for the cosmetic is not particularly limited, and a common method for producing a cosmetic can be applied. As the dispersion method, a disperser, a roll mill or the like is suitable.

EXAMPLES

Hereinafter, the present invention will be described in more detail by way of examples; however, the present invention is not limited thereto.

Example 1

300 ml of mineral spirit was put into a three-necked flask, and to this were added 200.0 g of an aluminum pigment (trademark: "Aluminum paste CS460" (metal content 50%, average particle size 16 μm), produced by Toyo Aluminium K.K.) as a metallic pigment, and 20.0 g of a carboxylic acid (trademark: "DIACID 1550", produced by Harima Chemicals Group, Inc.), which was obtained by thermally polymerizing acrylic acid with soybean oil fatty acid and which had a double bond, as a first compound. The resulting mixture was heated and stirred, cooled to normal temperature, and then subjected to a degreasing step by filtration. Thereby, a metallic pigment degreased with the first compound was obtained.

Then, 400 ml of mineral spirit as a solvent, 70.0 g of a yellow pigment (trademark: "IRGAZIN YELLOW 5GLT", produced by BASF Japan Ltd.) as a coloring pigment, 200.0 g of the metallic pigment subjected to the degreasing treatment as described above, 20.0 g of the same first compound as above, and 20.0 g of ethylamine as a second compound were charged into a kneader, and the resulting mixture was stirred at a temperature of 0 to 150° C. for 1 minute to 1 hour, and thereby, a slurry containing a colored metallic pigment, in which the coloring pigment adhered to the surface of the metallic pigment in the coexistence of the first compound and the second compound, was obtained.

Subsequently, 640 g of the slurry containing a colored metallic pigment obtained as above was put into a three-necked flask containing 1000 ml of mineral spirit, 1.0 g of acrylic acid was further added, and the resulting mixture was stirred. Then, a solution obtained by dissolving 30.0 g of trimethylolpropane trimethacrylate in 150 ml of mineral spirit, and a solution obtained by dissolving 10.0 g of azobisisobutyronitrile in 150 ml of mineral spirit were added to the mixture. The resulting mixture was heated (at 50 to 150° C.) and stirred (for 30 minutes to 30 hours), cooled to normal temperature, and filtered to give the colored metallic pigment of the present invention, which was provided with a protective layer composed of resin formed on the surface thereof.

Example 2

The colored metallic pigment of the present invention having a protective layer was obtained in the same manner as in Example 1 except that 20.0 g of triethanolamine was used as the second compound instead of 20.0 g of ethylamine.

Example 3

The colored metallic pigment of the present invention having a protective layer was obtained in the same manner as in Example 1 except that 20.0 g of ethylenediamine was used as the second compound instead of 20.0 g of ethylamine.

Example 4

The colored metallic pigment of the present invention having a protective layer was obtained in the same manner as in Example 1 except that 100 g of a red pigment (trademark: "IRGAZIN DPP RED BTR", produced by BASF Japan Ltd.) was used as the coloring pigment instead of 70.0 g of the yellow pigment and 20.0 g of alicyclic polyamine (trademark: "ADK STAB LA-67", produced by ADEKA CORPORATION) was used as the second compound instead of 20.0 g of ethylamine.

Example 5

The colored metallic pigment of the present invention having a protective layer was obtained in the same manner as in Example 1 except that 100 g of a blue pigment (trademark: "LONOL BLUE 7185-PM", produced by TOYO INK CO., LTD.) was used as the coloring pigment instead of 70.0 g of the yellow pigment and 20.0 g of dipropylenetriamine was used as the second compound instead of 20.0 g of ethylamine.

Example 6

The colored metallic pigment of the present invention having a protective layer was obtained in the same manner as in Example 1 except that 20.0 g of adipic acid (hexanedioic acid), a dibasic acid, was used as the first compound to be used in the step of charging the coloring pigment, the metallic pigment subjected to the degreasing treatment, the first compound, and the second compound into a kneader subsequent to the degreasing step instead of 20.0 g of the carboxylic acid (trademark: "DIACID 1550", produced by Harima Chemicals Group, Inc.), which was obtained by thermally polymerizing acrylic acid with soybean oil fatty acid and which had a double bond.

Comparative Example 1

A colored metallic pigment having a protective layer was obtained in the same manner as in Example 1 except that the degreasing step was not conducted, and the coloring pigment and the metallic pigment were mixed in the coexistence of only the first compound but excluding the second compound. This colored metallic pigment corresponds to the colored metallic pigment described in PTD 1.

Comparative Example 2

A colored metallic pigment having a protective layer was obtained in the same manner as in Example 1 except that the degreasing step was not conducted, and when mixing the coloring pigment and the metallic pigment, a coloring pigment surface-treated with the second compound (specifically, a yellow pigment (50.0 g), ethylene diamine (25.0 g) and mineral spirit (400 ml) were dispersed by a pot mill) was used and the first compound and the second compound were not added. This colored metallic pigment corresponds to the colored metallic pigment described in PTD 2.

<Evaluation Test>

The following tests were conducted by using the colored metallic pigments obtained as mentioned above in Examples 1 to 6 and Comparative Examples 1 and 2.

<Test 1>

4.0 g of each of the colored metallic pigments obtained in Examples 1 to 6 and Comparative Examples 1 and 2 was dispersed in 20 g of commercially available acryl lacquer (trademark: "ACRIC No. 2000 Clear", produced by Kansai Paint Co., Ltd.) to prepare a paint composition, and the paint composition was applied onto a piece of double-sided art paper by using a 150 μm doctor blade to prepare a coated plate.

The gloss value of each of the coated plates thus prepared was measured by using a glossmeter (trademark: "VG-2000", manufactured by NIPPON DENSHOKU INDUSTRIES CO., LTD.). The gloss value is measured at an incident angle of 60°. The higher the gloss value is, the higher the gloss will be. The results are shown in Table 1.

<Test 2>

The color saturation value of each of the coated plates thus prepared was measured by using a multi-angle spectrophotometer (trademark: "X-Rite MA-6811" manufactured by X-Rite Inc.). The color saturation value (C*) was calculated according to the following expression, using values a* and b* measured at an incident angle of 45° and an offset angle of 15°, respectively. The higher the color saturation value (C*) is, the higher the color saturation will be. The results are shown in Table 1.

Color saturation value $(C^*)=(a^{*2}+b^{*2})^{1/2}$

<Test 3>

After 0.2 g of the solid content of each of the colored metallic pigments obtained in Examples 1 to 6 and Comparative Examples 1 and 2 and 20 g of ethyl acetate were added to a 20-ml test tube and dispersed with thoroughly shaking, the mixture was stood still for 3 hours, and the elution pattern of the coloring pigment was observed. In this test, when the adhering force of the coloring pigment to the metallic pigment is insufficient, the supernatant fluid will be colored by the eluted coloring pigment, and when the adhering force is sufficient, the supernatant fluid will be transparent. The degree of transparency of the supernatant fluid was visually evaluated and rated in the following by four levels. The closer the supernatant fluid to colorless and transparent, it is shown that the color development is stable (that is, the adhesive property of the coloring pigment is high). The results are shown in Table 1.

A: colorless and transparent
B: transparent but slightly colored
C: transparent but colored
D: opaque and colored

TABLE 1

| | <Test 1> Gloss value | <Test 2> Color saturation value | <Test 3> Adhesive property |
|---|---|---|---|
| Example 1 | 16 | 43 | A |
| Example 2 | 18 | 47 | A |
| Example 3 | 18 | 45 | A |
| Example 4 | 16 | 49 | A |
| Example 5 | 15 | 42 | A |
| Example 6 | 15 | 44 | A |
| Comparative Example 1 | 13 | 32 | C |
| Comparative Example 2 | 15 | 35 | B |

As is apparent from Table 1, the colored metallic pigment in each of the Examples had good gloss or high color saturation in comparison to the colored metallic pigment in each of the Comparative Examples, and was excellent in adhesive property of the coloring pigment to the metallic pigment. Accordingly, the colored metallic pigment of the present invention was confirmed to exhibit an excellent effect such that the coloring pigment strongly adheres to the metallic pigment, and this provides good gloss or high color saturation.

As described above, the embodiments and examples of the present invention have been described; however, appropriate combinations of the constitutions of the respective embodiments and examples are also originally considered.

It should be understood that the embodiments and the examples disclosed herein are illustrative and non-restrictive in all aspects. It is intended that the scope of the present invention is defined by the claims, rather than the description above, and is intended to include any modifications within the meaning and scope equivalent to the claims.

The invention claimed is:

1. A method for producing a colored metallic pigment comprising:

preparing a metallic pigment, a coloring pigment, a first compound, and a second compound, said metallic pigment, said coloring pigment, said first compound and said second compound are all simultaneously mixed together; and adhering said coloring pigment to a surface of said metallic pigment in coexistence of said first compound and said second compound, wherein said first compound is a compound having two or more carboxyl groups, and said second compound is a compound having one or more amino groups.

2. The method for producing the colored metallic pigment according to claim 1, wherein said first compound is a polymer of an unsaturated carboxylic acid, and said second compound is an amine having one or more amino groups.

3. The method for producing the colored metallic pigment according to claim 2, wherein said first compound is a polymerized carboxylic acid obtained by polymerizing linseed oil fatty acid or soybean oil fatty acid, or a polymerized carboxylic acid obtained by polymerizing linseed oil fatty acid or soybean oil fatty acid with acrylic acid, and said second compound is at least one amine selected from the group consisting of ethylenediamine, phenylenediamine, tetramethylenediamine, pentamethylenediamine, hexamethylenediamine, 1,12 -dodecanediamine, alicyclic diamine, alicyclic triamine, alicyclic tetraamine, and alicyclic polyamine.

4. The method for producing the colored metallic pigment according to claim 1, further comprising forming a protective layer on a surface of said colored metallic pigment.

* * * * *